United States Patent
Umayahara et al.

(10) Patent No.: US 9,905,869 B2
(45) Date of Patent: Feb. 27, 2018

(54) FUEL CELL SYSTEM AND METHOD OF CONTROLLING THE SAME

(75) Inventors: Kenji Umayahara, Nishikamo-gun (JP); Takeshi Maenaka, Toyota (JP); Atsushi Imai, Gamagori (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1091 days.

(21) Appl. No.: 12/675,299

(22) PCT Filed: Dec. 17, 2008

(86) PCT No.: PCT/JP2008/073499
§ 371 (c)(1),
(2), (4) Date: Feb. 25, 2010

(87) PCT Pub. No.: WO2009/084553
PCT Pub. Date: Jul. 9, 2009

(65) Prior Publication Data
US 2010/0239930 A1    Sep. 23, 2010

(30) Foreign Application Priority Data
Dec. 27, 2007    (JP) ................................. 2007-337557

(51) Int. Cl.
*H01M 8/04*          (2016.01)
*H01M 8/04537*       (2016.01)
(Continued)

(52) U.S. Cl.
CPC ..... *H01M 8/04649* (2013.01); *H01M 8/0491* (2013.01); *H01M 8/04492* (2013.01);
(Continued)

(58) Field of Classification Search
CPC ..... H01M 2008/1095; H01M 8/04492; H01M 8/04552; H01M 8/04559; H01M 8/04649; H01M 8/0491; Y02E 60/50
(Continued)

(56) References Cited

U.S. PATENT DOCUMENTS

2002/0192520 A1*  12/2002  Nonobe ................... 429/23

FOREIGN PATENT DOCUMENTS

JP    2002-164065 A        6/2002
JP    2002164065 A  *      6/2002
(Continued)

*Primary Examiner* — Milton I Cano
*Assistant Examiner* — Ling R Zeng
(74) *Attorney, Agent, or Firm* — Andrews Kurth Kenyon LLP (57) ABSTRACT

In the event that at least a portion of unit cells in a fuel cell stack have experienced a significant drop in voltage, the fuel cell system will execute a voltage recovery process allowing them to recover generating capability. In the voltage recovery process, a controller measures impedance of the fuel cell stack, and based on these measurements, determines the hydration condition of the electrolyte membrane inside the fuel cell. If, during the determination of hydration condition, the controller has determined that the hydration level is low, a current limiting process for temporarily limiting output of the fuel cell in order to recover generating capability will be triggered under more lenient conditions, as compared to if determined that the hydration level is high.

6 Claims, 7 Drawing Sheets

(51) Int. Cl.
*H01M 8/04492* (2016.01)
*H01M 8/04858* (2016.01)
*H01M 8/1018* (2016.01)

(52) U.S. Cl.
CPC ... *H01M 8/04552* (2013.01); *H01M 8/04559* (2013.01); *H01M 2008/1095* (2013.01)

(58) Field of Classification Search
USPC .................. 429/428, 430, 431, 432, 427
See application file for complete search history.

(56) References Cited

FOREIGN PATENT DOCUMENTS

| | | |
|---|---|---|
| JP | 2003-178785 A | 6/2003 |
| JP | 2004-172055 A | 6/2004 |
| JP | 2004-349067 A | 12/2004 |
| JP | 2005-197008 A | 7/2005 |
| JP | 2007-329028 A | 12/2007 |

\* cited by examiner

Fig.2

SYSTEM ELECTRICAL CONFIGURATION

First current limit value map (Dry flag: OFF)

Fig.6B

Second current limit value map (Dry flag: ON)

Fig.7

continues …

FUEL CELL SYSTEM AND METHOD OF CONTROLLING THE SAME

This is a 371 national phase application of PCT/JP2008/073499 filed 17 Dec. 2008, which claims priority of Japanese Patent Application No. 2007-337557 filed 27 Dec. 2007, the contents of which are incorporated herein by reference.

TECHNICAL FIELD

The present invention relates to a fuel cell system and to a method of controlling the same.

BACKGROUND ART

A typical fuel cell has a stacked structure comprising a number of stacked power generating elements (or membrane-electrode assemblies) each having an electrolyte membrane sandwiched by electrodes. Because a fuel cell collects electrical power generated by the individual generating elements and supplies it to an external load, it is desirable that the individual generating elements be able to generate an electrical power in a uniform manner. To this end, there has been proposed recovery processes whereby, if a significant decline in generating capacity of some portion of the generating elements has been detected, the output of the entire fuel cell will be restricted so that this portion of generating elements can recover (see inter alia JP2005-197008A and JP2002-164065A).

It is furthermore desirable in a fuel cell to maintain the electrolyte membrane in an appropriately hydrated state during continuous generation of electricity. If a fuel cell continues to generate electricity when the electrolyte membrane has become dry, there is a possibility that the electrolyte membrane will become degraded. However, even if the electrolyte membrane has reached a condition of dryness that could potentially lead to such degradation, if no decline in generating capacity sufficient to trigger the recovery process is detected, the fuel cell will continue to generate electricity, which may result in degradation of the fuel cell. To date, there exist no sufficient measures for addressing this problem.

It is accordingly one object of the present invention to provide technology for suppressing degradation of a fuel cell.

DISCLOSURE OF THE INVENTION

The above objects of this invention may be attained at least in part according to at the following aspects and modes of the invention.

A fuel cell system according to an aspect of the present invention comprises: a fuel cell; a hydration condition detector adapted to detect a hydration condition index that is associated with hydration condition inside the fuel cell; and a controller adapted to control output of the fuel cell according to output requirement for the fuel cell system, wherein the controller executes a current limiting process for bringing a current value of the fuel cell to a value lower than a required current value which is equivalent to the output requirement, in order to temporarily limit output of the fuel cell, and if the hydration condition index indicates a lower hydration level, execution of the current limiting process will be triggered under more lenient conditions, as compared with if a higher hydration level is indicated.

According to this fuel cell system, the probability that the current limiting process will be triggered becomes progressively higher in association with lower hydration levels inside the fuel cell, and application of excessive load while the electrolyte membrane is in a dried condition due to insufficient hydration in the fuel cell interior will be avoided. Consequently, degradation of the fuel cell may be suppressed.

The fuel cell system may further comprise a voltage measuring portion adapted to measure voltage of the fuel cell, wherein the current limiting process is triggered when the measurement taken by the voltage measuring portion is smaller than a threshold value, and the controller sets the threshold value to progressively smaller values in association with higher hydration levels as indicated by the hydration condition index.

According to this fuel cell system, when a voltage drop of the fuel cell has been detected, the voltage threshold value at which the current limiting process is triggered becomes progressively lower in association with higher hydration levels as indicated by the hydration condition index. Consequently, if the hydration level in the fuel cell interior is low, the current limiting process will be triggered more easily, and degradation of the fuel cell may be suppressed more appropriately.

In the fuel cell system, the fuel cell may include a plurality of power generating elements, the voltage measuring portion may measure voltage individually for each of the plurality of power generating elements, and the current limiting process is triggered when the measurement for at least one of the plurality of power generating elements has fallen below the threshold value.

According to this fuel cell system, application of excessive load to only a portion of the plurality of power generating elements that make up the fuel cell will be avoided, so that degradation of this portion of the power generating elements will be suppressed.

In the fuel cell system, the hydration condition detector may include an impedance measuring portion adapted to measure resistance of the fuel cell as the hydration condition index, and the controller may set the threshold value to progressively smaller values in association with smaller measurements taken by the impedance measuring portion.

According to this fuel cell system, the higher impedance of the fuel cell is associated with lower hydration level inside the fuel cell and lower voltage threshold value at which the current limiting process is triggered, thereby triggering the current limiting process relatively early. Consequently, degradation of the fuel cell may be suppressed more appropriately.

In the fuel cell system in accordance, the hydration condition index may include a first value indicating relatively low hydration level, and a second value indicating relatively high hydration level, and the controller may set the hydration condition index to the first value until the hydration condition index has been detected by the hydration condition detector.

According to this fuel cell system, during the period between startup of the fuel cell system and detection of the hydration condition index, the hydration condition index remains set to the first value employed as an initial value. Thus, during initial operation of the fuel cell system, at which time excessive load typically tends to be required of the fuel cell, the probability of triggering the current limiting process on the fuel cell will be relatively high. Thus, degradation of the fuel cell may be suppressed.

There are any number of possible modes for working the present invention, for example, a fuel cell; a fuel cell system furnished with the fuel cell; or a vehicle having such a fuel cell system installed thereon.

BEST MODE FOR CARRYING OUT THE INVENTION

Figure 1:
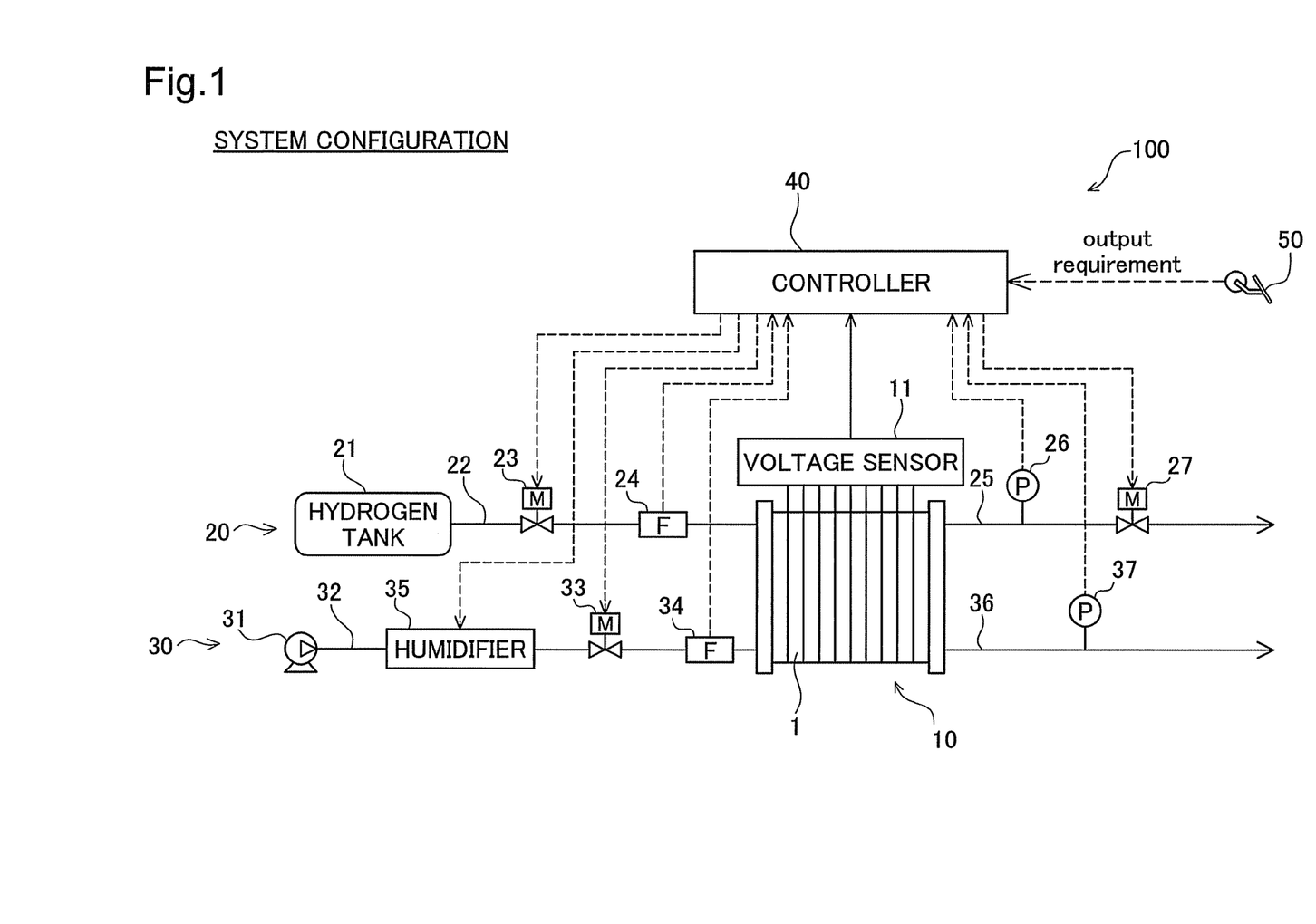
FIG. 1 is a schematic diagram depicting a configuration of a fuel cell system.

A. Embodiment 1:

FIG. 1 is a schematic diagram depicting a configuration of a fuel cell system according to one embodiment of the present invention. This fuel cell system 100 includes a fuel cell stack 10, a hydrogen supply system 20 and an air supply system 30 which are connected to the fuel cell stack 10, and a controller 40.

The fuel cell stack 10 is a solid polymer fuel cell that is supplied with hydrogen and oxygen, and generates electrical current through an electrochemical reaction between these reactant gases. However, the fuel cell stack 10 need not necessarily be a solid polymer fuel cell, it being possible to implement the invention in any of various kinds of fuel cell.

The fuel cell stack 10 has a stack structure including a plurality of unit cells 1 each having a power generating element with an electrolyte membrane sandwiched by electrodes. The fuel cell stack 10 is also furnished with a voltage sensor 11 that is adapted to measure potential in each individual unit cell 1.

The hydrogen supply system 20 includes a hydrogen tank 21 for storing the hydrogen, and a hydrogen feed line 22. The hydrogen tank 21 is connected by the hydrogen feed line 22 to a hydrogen feed manifold (not shown) provided to the fuel cell stack 10 so that the hydrogen supply system 20 may supply hydrogen to the fuel cell stack 10. On the hydrogen feed line 22 are disposed, starting from the upstream end, a pressure regulator valve 23 for regulating the pressure of the hydrogen, and a gas flow meter 24 for measuring the flow rate of the hydrogen.

The hydrogen supply system 20 is also furnished with a hydrogen discharge line 25 connected to a hydrogen discharge manifold (not shown) of the fuel cell stack 10. The hydrogen discharge line 25 discharges to outside the fuel cell stack 10 the anode off-gases, which contain hydrogen that was not consumed in the electrochemical reaction. On the hydrogen discharge line 25 are disposed, starting from the upstream end, a pressure gauge 26 for measuring hydrogen pressure, and a hydrogen discharge valve 27 consisting of an on-off valve for halting discharge of the anode off-gases if needed.

The air supply system 30 includes an air compressor 31 and an air feed line 32. The air compressor 31 is connected by the air feed line 32 to an air feed manifold (not shown) provided to the fuel cell stack 10 so that the air supply system 30 may supply compressed air to the fuel cell stack 10. On the hydrogen feed line 32 are disposed, starting from the upstream end, a humidifier 35 for humidifying the compressed air, a pressure regulator valve 33 for regulating the pressure of the compressed air, and a gas flow meter 34 for measuring the flow rate of the compressed air.

The air supply system 30 is also furnished with an air discharge line 36 connected to an air discharge manifold (not shown) of the fuel cell stack 10. The air discharge line 36 discharges to outside the fuel cell stack 10 the cathode off-gases, which contain oxygen that was not consumed in the electrochemical reaction. A pressure gauge 37 for measuring pressure of the cathode off-gases is provided on the air discharge line 36.

Where the fuel cell system 100 has been installed on a moving body such as a car for example, the controller 40 will detect the output requirement for the fuel cell system 100 (termed the "external output requirement") based on an external load that is dependent on the level of depression of the accelerator pedal 50. The controller 40 also acquires status information for the system from various sensors, such as the two gas flow meters 24, 34, the two pressure gauges 26, 37, and the voltage sensor 11 mentioned previously. Based on the external output requirement and this system status information, the controller 40 will control opening and closing of the pressure regulator valves 23, 33 and the hydrogen discharge valve 27 to control the output of the fuel cell stack 10. The controller 40 also regulates the humidity level produced by the humidifier 35 in the compressed air supplied to the fuel cell stack 10.

Figure 2:
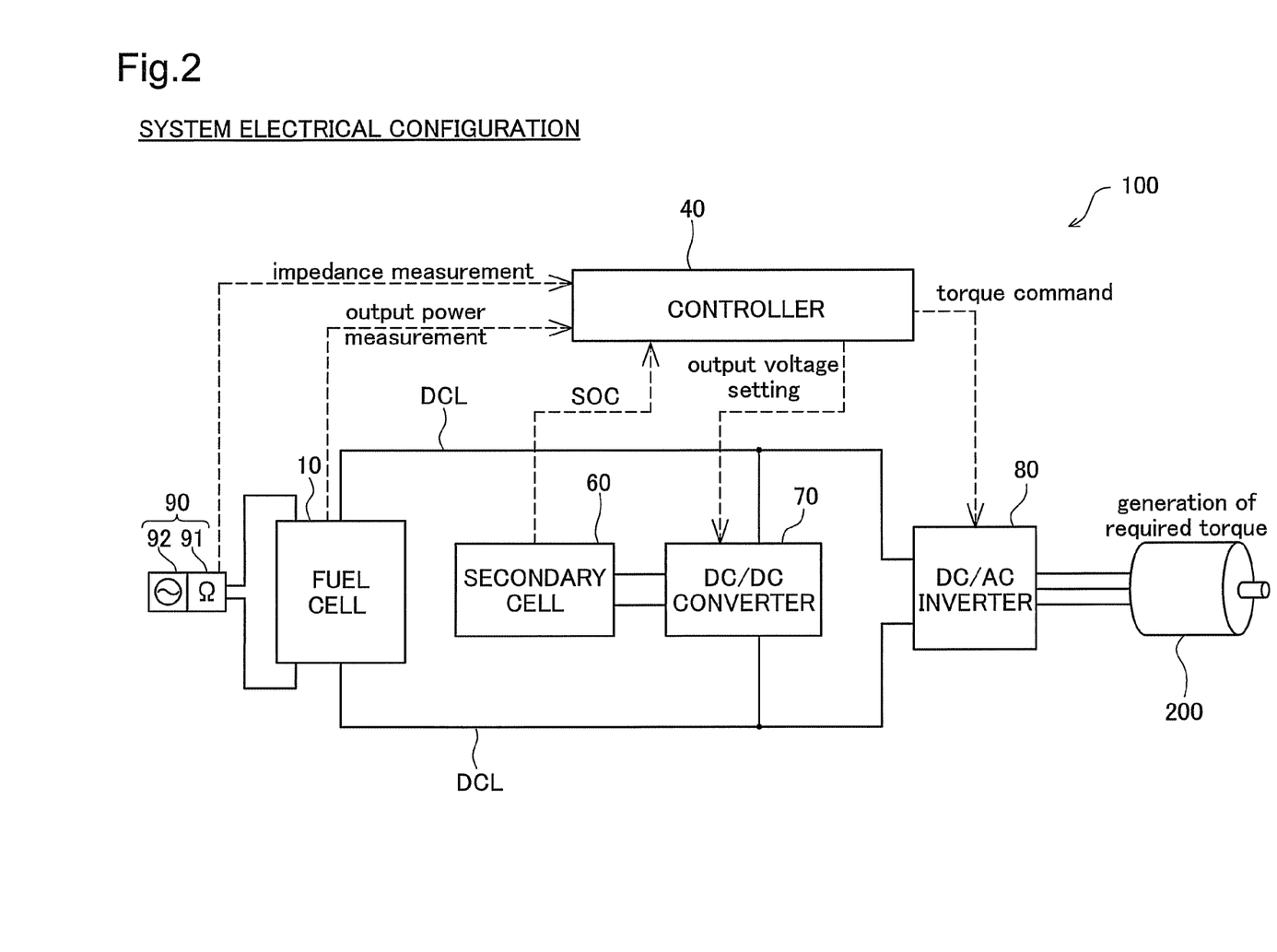
FIG. 2 is a schematic diagram showing the electrical configuration of the fuel cell system.

FIG. 2 is a block diagram showing the electrical configuration of the fuel cell system 100. The fuel cell system 100 further includes a secondary cell 60, a DC/DC converter 70, a DC/AC inverter 80, and an impedance measuring portion 90.

The fuel cell stack 10 is connected to the DC/AC inverter 80 via a DC power supply line DCL. The secondary cell 60 is connected to the DC power supply line DCL via the DC/DC converter 70. The DC/AC inverter 80 is connected to an external load, in this case, a motor 200.

The secondary cell 60 functions as an auxiliary power unit for the fuel cell stack 10, and may be composed of a rechargeable lithium ion cell for example. The DC/DC converter 70 functions as a charge/discharge controller for controlling charging and discharging of the secondary cell 60, and performs variable adjustment of the voltage level on the DC power supply line DCL in response to instructions from the controller 40. In instances where the output of the fuel cell stack 10 is not sufficient to meet the external output requirement, the DC/DC converter 70 will discharge electricity from the secondary cell 60 so as to compensate for this deficit.

The DC/AC inverter 80 converts DC power obtained from the fuel cell stack 10 and the secondary cell 60 into AC power. The motor 200 may be composed of a three-phase motor or the like, and will generate rotational driving force in response to AC power from the DC/AC inverter 80. When its outside rotor is rotated by external forces, the motor 200 will function as a generator and will generate AC power (regenerative power). This regenerative power will be converted to DC power by the DC/AC inverter 80, and used to charge the secondary cell 60 via the DC/DC converter 70.

The impedance measuring portion 90 is furnished with a measuring meter 91 for measuring impedance, and an AC power supply 92. The measuring meter 91 is connected to the fuel cell stack 10, and measures impedance of the fuel cell stack 10 during power generation. The impedance measuring portion 90 sends the measurement results to the controller 40.

From measurements provided by the voltage sensor 11 (FIG. 1), the controller 40 detects output power measurements (the state of power generation) of the fuel cell stack 10. The controller 40 also detects the state of charge (SOC) of the secondary cell 60. Based on these pieces of information, the controller 40 will set the output voltage of the DC/DC converter 70 and control the output power of the fuel cell stack 10 and of the secondary cell 60. The controller 40 also controls AC power frequency through the DC/AC inverter 80, and causes the motor 200 to generate the required torque (torque command).

Figure 3A:
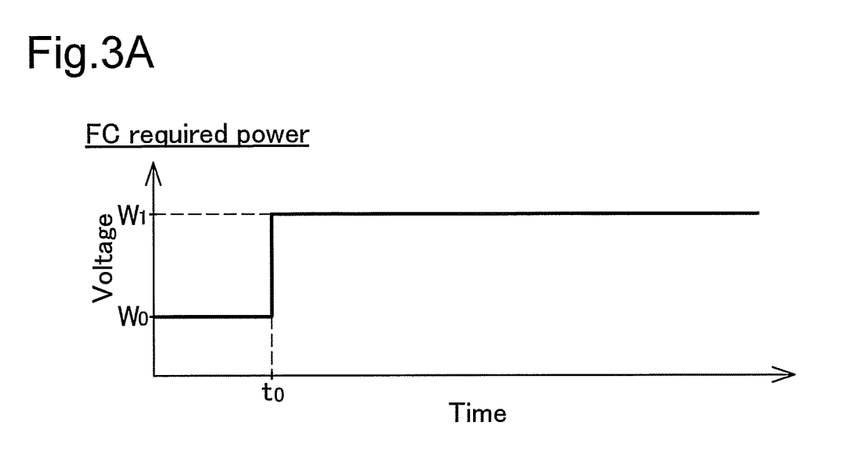
FIGS. 3A to 3C are drawings illustrating control of a fuel cell during normal operation.
Figure 3B:
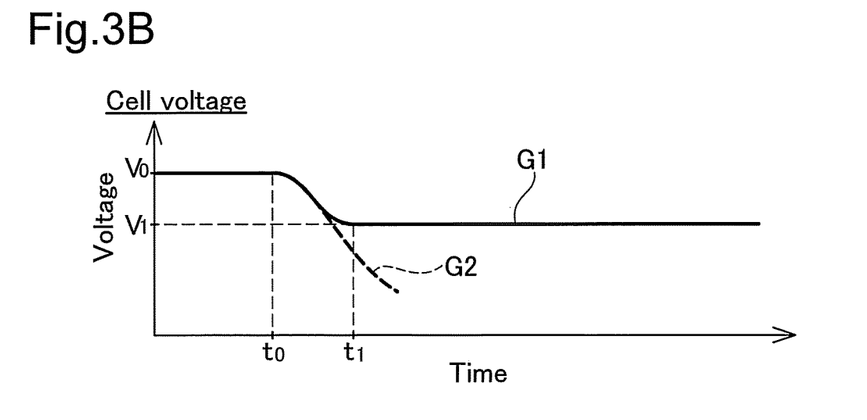
Figure 3C:
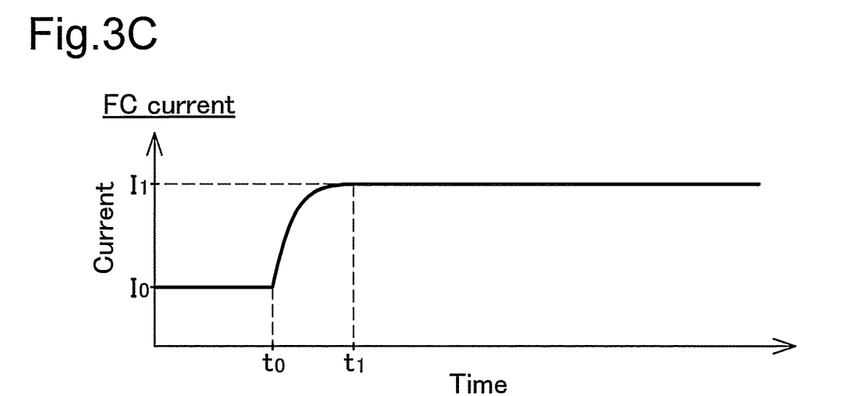

FIGS. 3A to 3C are drawings illustrating control of the fuel cell system 100 during normal operation. Here, "normal operation" refers to a state of continuous power generation without any abnormal drop in voltage in the unit cells 1 of the fuel cell stack 10 according to an output command from the controller 40.

FIG. 3A is a graph depicting time variation of output voltage required of the fuel cell stack 10 by the controller 40 (this will be termed "FC required power"). The graph of FIG. 3A shows that in association with an increase in external output requirement at time $t_0$, the controller 40 will increase the level of FC required power from $W_0$ to $W_1$, and will thereafter maintain the level of FC required power at $W_1$.

On the basis of the W-I characteristics of the fuel cell stack 10, the controller 40 will calculate a current value for output by the fuel cell stack 10 according to the level of FC required power, and establish in the DC/DC converter 70 (FIG. 2) an output voltage in accordance with this current value. The controller 40 will then control the flow rates of the reactant gases and the amounts of off-gases through the pressure regulator valves 23, 33 and the hydrogen discharge valve 27 (FIG. 1) so that the fuel cell stack 10 is able to output the required power.

FIG. 3B is a graph depicting time variation of output voltage in any unit cell 1 of the fuel cell stack 10, when there has been a change in the level of FC required power as shown in FIG. 3A. In FIG. 3B, the solid line graph G1 indicates that the output voltage value of each individual unit cell 1 of the fuel cell stack 10 will decline from a voltage value $V_0$ beginning at time $t_0$, then at time t1 will reach an output voltage value $V_1$ equivalent to the level of FC required power, and thereafter be maintained at the voltage value $V_1$. The output voltage of the fuel cell stack 10 as a whole will be the sum of the output voltages of the individual unit cells 1.

FIG. 3C is a graph depicting time variation of output current of the fuel cell stack 10, when there has been a change in the level of FC required power as shown in FIG. 3A. Owing to the V-I characteristics of the fuel cell stack 10, the output current of the fuel cell stack 10 will increase from a current value of $I_0$ to a current value of $I_1$ during the interval between time $t_0$ and time $t_{10}$ in synchronism with the output voltage change shown in FIG. 3B, and will thereafter be maintained at a current value of $I_1$.

During normal operation as described here, the unit cells 1 will output the output voltage indicated in FIG. 3B in a substantially uniform manner, as mentioned previously. However, once the current value $I_1$ required to be output has been reached, in some instances, some of the unit cells 1 in the fuel cell stack 10 may experience a considerable drop in output voltage (as indicated by the broken line graph G2 in FIG. 3B) and may further drop to negative voltage in some instances. Possible causes for this could include a marked increase in internal resistance in some of the unit cells for some reason, to an insufficient reactant gas feed rate, or to insufficient hydration of the electrolyte membrane.

If the fuel cell stack 10 continues to generate power while some of the unit cells 1 have experienced this sort of considerable drop in output voltage, not only will the fuel cell stack 10 as a whole experience a decline of generation efficiency, but degradation of the unit cells 1 in question may result as well. According to the present embodiment, in such instances, for the unit cell 1 that out of all of the plurality of unit cells 1 has experienced the greatest drop in voltage, the voltage recovery process described below will be carried out in the event it is detected that the voltage level of this unit cell has fallen below a prescribed threshold value (termed the "recovery process trigger threshold value"). Hereinbelow, the unit cell 1 experiencing the greatest drop in voltage will be termed a "low voltage cell 1", and the voltage detected in the low voltage cell 1 will be termed the "lowest cell voltage".

Figure 4:
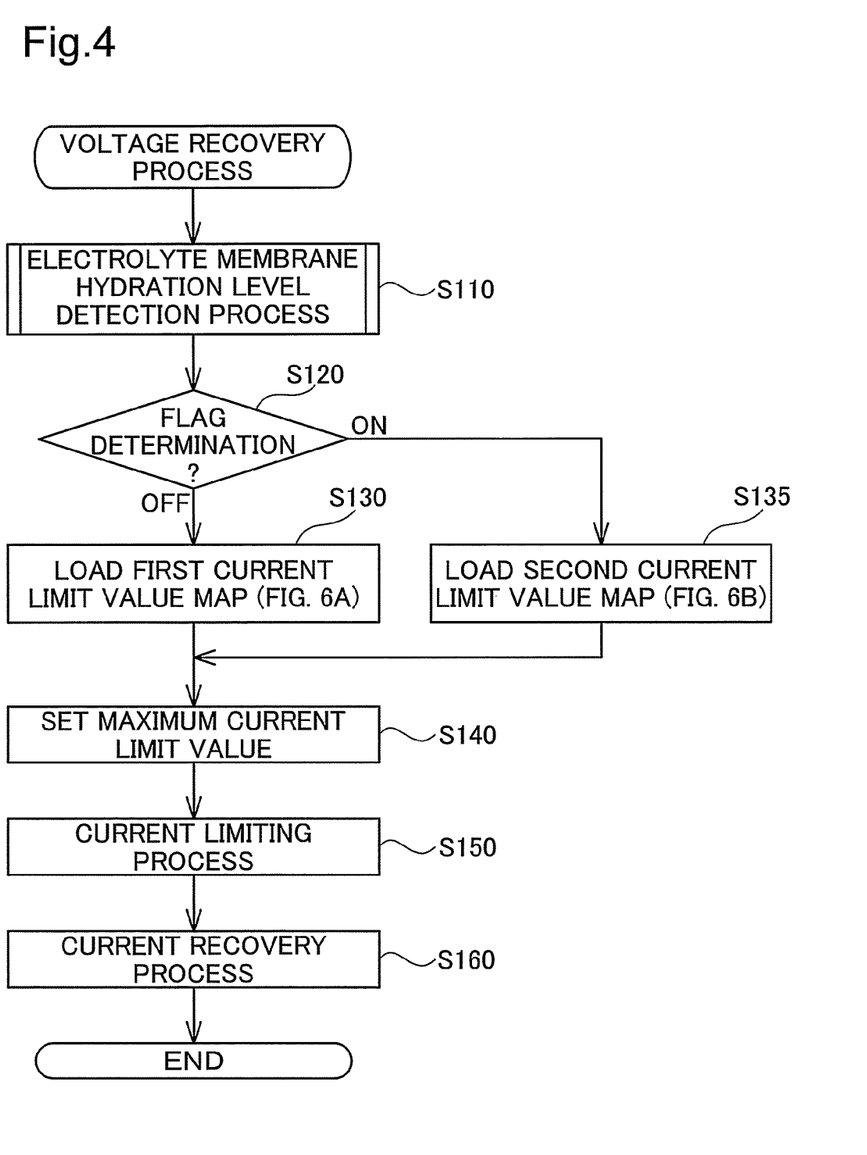
FIG. 4 is a flowchart showing a processing routine of a voltage recovery process.

FIG. 4 is a flowchart showing the processing routine of the voltage recovery process in the fuel cell system 100. In Step S110, an electrolyte membrane hydration level detection process for detecting hydration levels of the electrolyte membranes in the fuel cell stack 10 is carried out.

The reason for detecting the hydration level of the electrolyte membrane is to verify whether insufficient hydration of the electrolyte membrane is the cause of the drop in voltage observed in the low voltage cell 1. In general, it is desirable in a fuel cell for the electrolyte membrane to be maintained in a state of appropriate hydration during electricity generation, because if the fuel cell continues to generate electricity with the electrolyte membrane in a state of insufficient hydration, degradation of the electrolyte membrane may result. For this reason, in the fuel cell system 100 herein, the hydration level of the electrolyte membrane is detected, and an appropriate voltage recovery process is carried out depending on the hydration level of the electrolyte membrane. The electrolyte membrane hydration level detection process is specifically carried out as follows.

Figure 5:
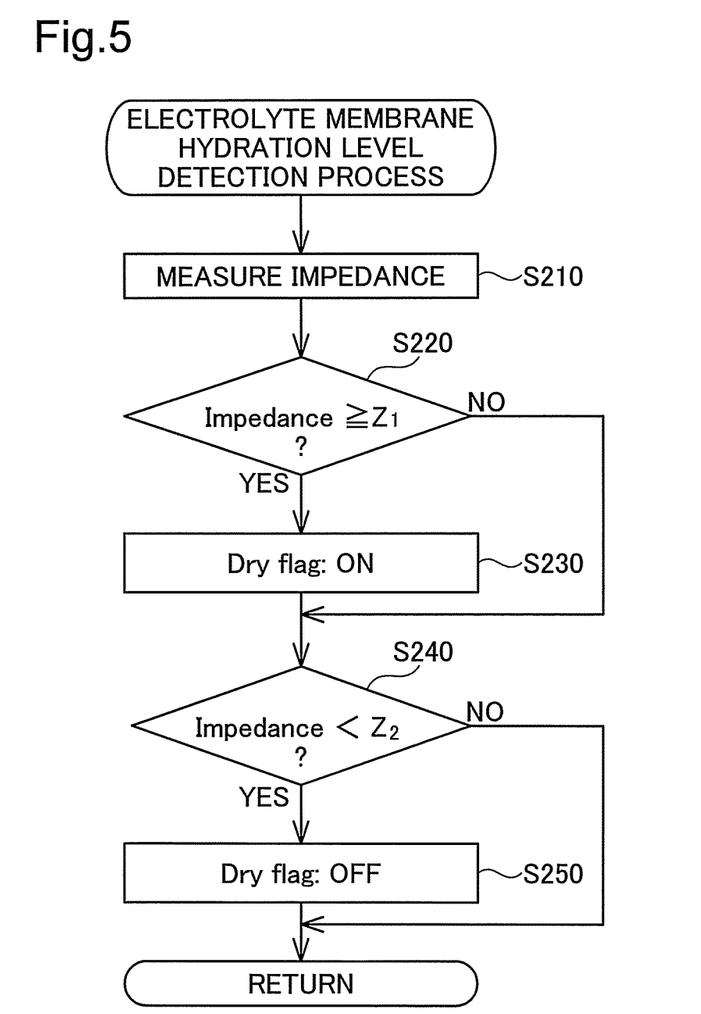
FIG. 5 is a flowchart showing a processing routine of an electrolyte membrane hydration level detection process.

FIG. 5 is a flowchart showing the processing routine of the electrolyte membrane hydration level detection process. In Step S210, the controller 40 measures the impedance of the fuel cell stack 10 through the impedance measuring portion 90. Here, the reason for measuring impedance is that, because impedance of a fuel cell typically rises in association with a decline in moisture in the interior of the fuel cell, it is possible to estimate the moisture level inside the fuel cell by measuring its impedance. That is, in this fuel cell system 100, it may be understood that the impedance value of the fuel cell stack 10 is detected by way of a hydration condition index that is associated with hydration conditions inside the fuel cell stack 10.

In Step S220, the controller 40 performs a comparison of the impedance value obtained in Step S210 with a first impedance value $Z_1$. Here, the "first impedance value $Z_1$" is a threshold value that serves as a criterion for deciding whether or not the electrolyte membrane is in appropriately hydrated condition. This first impedance value $Z_1$ has been set in the controller 40 beforehand, to an appropriate value derived through testing or the like.

If the measured impedance value is equal to or greater than the first impedance value $Z_1$, the controller 40 will set a Dry flag to "ON" (Step S230). The "Dry flag" is one internal variable of the controller 40 indicative of the condition of the fuel cell system 100, and indicates whether or not the fuel cell stack 10 is in an appropriately hydrated condition. Specifically, when the Dry flag is "ON", this indicates that the electrolyte membrane has an insufficient hydration level, and that the electrolyte membrane is in a dried condition. On the other hand, when the Dry flag is "OFF", this indicates that the electrolyte membrane is in appropriately hydrated condition. That is, if the impedance of the fuel cell stack 10 is equal to or greater than the first impedance value $Z_1$, the controller 40 will decide that that the electrolyte membrane has an insufficient hydration level.

In preferred practice the Dry flag will be set to "ON" as its initial value at startup of the fuel cell system 100. In this case, the Dry flag will be maintained in the "ON" state from the time of startup of the fuel cell system 100 until the impedance measurement of Step S210 is carried out and the Dry flag is updated.

The reason for setting the initial value of the Dry flag to "ON" is as follows. During startup of the fuel cell system 100, particularly under low-temperature (e.g. below freezing) conditions, there is a high probability that the electrolyte membrane will be dry, as well as a high probability that excessive load requirements will be placed on the fuel cell stack 10. Thus, by setting the initial value of the Dry flag to "ON" and increasing the probability of triggering the current limiting process (FIG. 4: Step S150) at startup (described later), application of excessive load to the fuel cell stack 10 will be avoided.

In Step S240, the controller 40 performs a comparison of the impedance value of the fuel cell stack 10 with a second impedance value $Z_2$, and if the impedance value of the fuel cell stack 10 is lower than the second impedance value $Z_2$, will set the Dry flag to "OFF" in Step S250. Here, the "second impedance value $Z_2$" is a threshold value that serves as a criterion for determining whether the electrolyte membrane has transitioned from a dry condition to an appropriately hydrated condition. This second impedance value $Z_2$ has been set in the controller 40 beforehand, to an appropriate value derived through testing or the like. That is, in the fuel cell system 100 herein, once the Dry flag has been set "ON", the Dry flag will be maintained in the "ON" state as long as the impedance value of the fuel cell stack 10 does not go below the second impedance value $Z_2$.

Once the Dry flag has been set in the electrolyte membrane hydration level detection process (Step S110), the controller 40 will execute the flag determination process of Step S120 of the voltage recovery process (FIG. 4). If the Dry flag is "OFF", the controller 40 will load a first current limit value map (Step S130), whereas if the Dry flag is "ON", it will load a second current limit value map (Step S135).

Here, the current limit value maps are maps utilized for deciding, with reference to the value of minimum cell voltage, upon a maximum current limit value (discussed later) for use in a current limiting process which will be discussed later (Step S150). Specifically, in this fuel cell system 100, depending on the result Of the determination by the controller 40 as to the hydration condition of the electrolyte membrane, a different current limit value map will be loaded; and on the basis of minimum cell voltage, a maximum current limit value Il will then be set according to the hydration condition of the electrolyte membrane (Step S140). The current limit value maps have been stored beforehand in storage (not shown) of the controller 40.

Figure 6A:
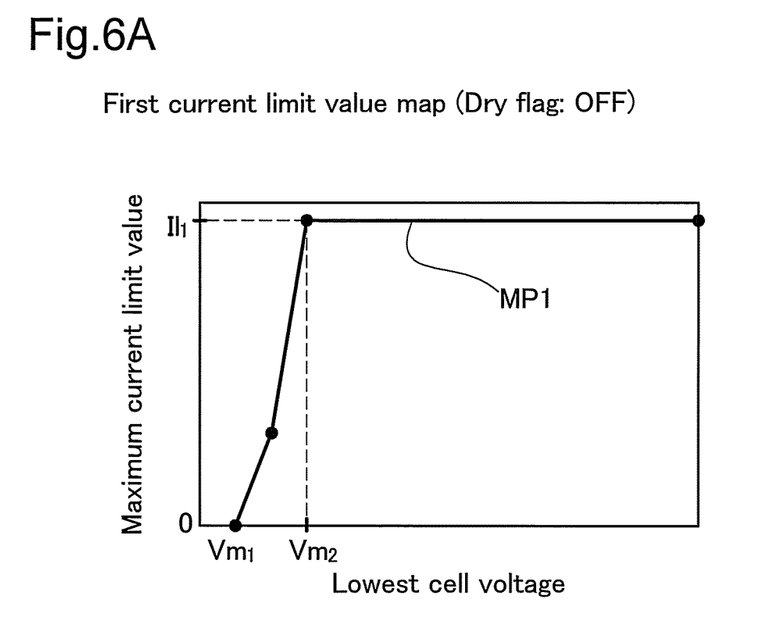
FIGS. 6A and 6B are drawings depicting a specific example of a first and a second current limit value map.
Figure 6B:
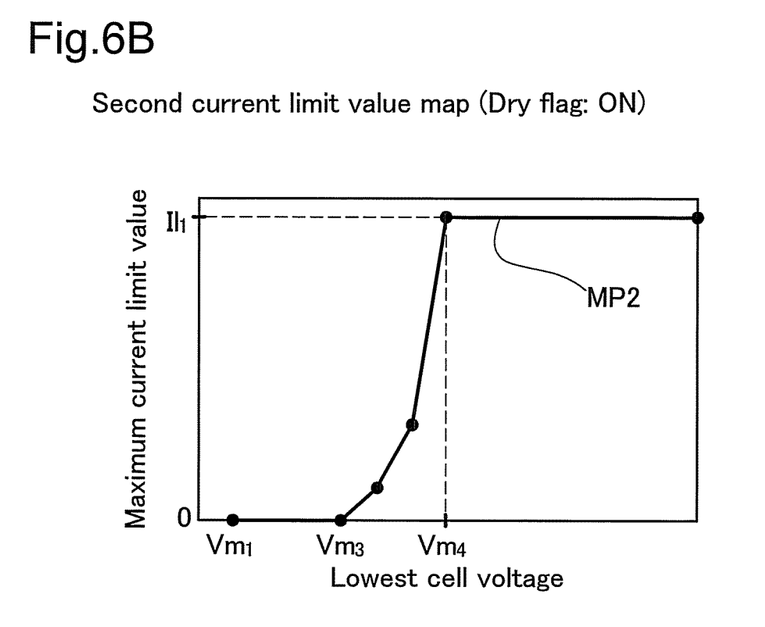

FIGS. 6A and 6B depict a specific example of a first and a second current limit value map. FIG. 6A depicts the first current limit value map as a graph MP1 showing maximum current limit value plotted against minimum cell voltage. In the first current limit value map MP1, in a range of minimum cell voltage values from $Vm_1$ to $Vm_2$ ($Vm_1 < Vm_2$), the maximum current limit value increases in generally exponential fashion from a maximum current limit value of 0 to $Il_1$, and where minimum cell voltage is $Vm_2$ or above, the maximum current limit value is constant at $Il_1$. The maximum current limit value $Il_1$ equals the current value $I_1$ of the fuel cell stack 10 at the point in time that the voltage recovery process is initiated. Hereinbelow, this current value $I_1$ will be termed the "pre-limitation current value $I_1$".

In the current limiting process carried out in Step S150, the current output by the fuel cell stack 10 will be limited to the maximum current limit value. Specifically, when this first current limit value map MP1 has been loaded, limitation of current in the current limiting process will actually take place when the maximum current limit value goes below the pre-limitation current value $I_1$ or when the minimum cell voltage is less than $Vm_2$.

FIG. 6B depicts the second current limit value map as a graph MP2 showing maximum current limit value plotted against the minimum cell voltage detected by the controller 40, and apart from the points discussed below is analogous to FIG. 6A. In the second current limit value map MP2, in a minimum cell voltage range from $Vm_1$ to $Vm_3$ ($Vm_1 < Vm_3$), maximum current limit value is maintained constant at zero. In a minimum cell voltage range from $Vm_3$ to $Vm_4$ ($Vm_2$, $Vm_3 < Vm_4$), maximum current limit value increases in generally exponential fashion from a maximum current limit value of 0 to $Il_1$; and where minimum cell voltage is $Vm_4$ or above, the maximum current limit value is constant at $Il_1$.

As compared with the first current limit value map MP1, in the current limit value map MP2 the maximum current limit value will go below $Il_1$ at a higher minimum cell voltage $Vm_4$ ($Vm_2 < Vm_4$). That is, in this fuel cell system 100, the current limiting process will be triggered at higher minimum cell voltage when the Dry flag in "ON", than when the Dry flag is "OFF". This can be understood as meaning that the current limiting process will be triggered under more lenient conditions when the Dry flag is "ON" as compared to when the Dry flag is "OFF". Additionally, in this fuel cell system 100, even where the same minimum cell voltage is detected, the amount of current that is limited in the current limiting process will be greater when the Dry flag is "ON".

Figure 7:
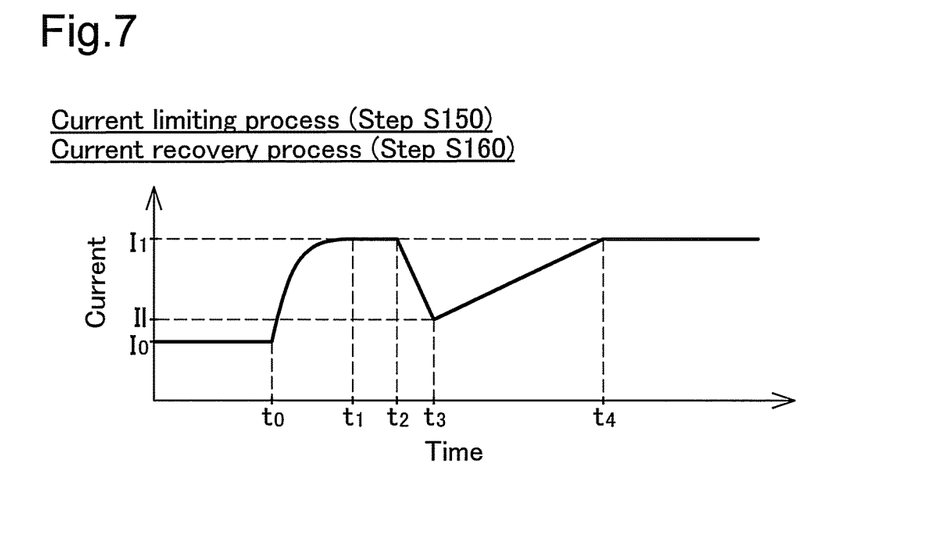
FIG. 7 is a drawing illustrating a current limiting process and a current recovery process.

FIG. 7 is a drawing illustrating a current limiting process and a current recovery process of Steps S150 and S160 (FIG. 4). FIG. 7 is analogous to FIG. 3C, except that the current value rises and falls between time $t_2$ and time $t_4$.

In the current limiting process of Step S150, the controller 40 will control the output current of the DC/DC converter (FIG. 2) to reduce the output current of the fuel cell stack 10 to the maximum current limit value Il at a prescribed constant rate with respect to time (time $t_2$ to time $t_3$). That is, the output current of the fuel cell stack 10 is limited in the manner described above. The reason for limiting the output current of the fuel cell stack 10 in this way is to moderate excessive load to which the low-voltage cell 1 is subjected, so that the low-voltage cell 1 may recover its generating capability. In the current limiting process, this current reduction need not take place at a constant rate.

Together with the current limiting process, the controller 40 will also execute, for example, a process to increase the reactant gas flows to the fuel cell stack 10, or a process to increase gas pressure of the reactant gases, in order to bring about recovery of generating capability by the low-voltage cell 1. Additionally, if the Dry flag is "ON", the controller 40 will execute a humidification process, such as increasing the level of humidification of the compressed air by the humidifier 35 (FIG. 1), in order to eliminate the hydration level deficit of the electrolyte membrane. The humidification process may also be accomplished through some other process.

In the current recovery process of Step S160, the controller 40 will control the output current of the DC/DC converter (FIG. 2) to increase the output current of the fuel cell stack 10 at a prescribed constant rate with respect to time. By so doing, during interval between time $t_3$ and time $t_4$, the output voltage of the fuel cell stack 10 will recover from the maximum current limit value Il to the current value $I_1$ which is a current value prior to initiation of the current limiting process. In the current recovery process, this current increase need not take place at a constant rate.

During execution of the current recovery process (time $t_3$ to time $t_4$), the low-voltage cell 1 will experience a rise in its output voltage value to a voltage value of $V_1$, in association with recovery of generating capacity. During the interval between time $t_2$ to time $t_4$ in which the current limiting process and the current recovery process take place, the power deficit with respect to the external required power will be compensated for from the secondary cell 60 (FIG. 2).

In this way, with this fuel cell system 100, if an abnormal voltage drop occurs in some of the unit cells 1, those unit cells 1 can recover their generating capacity through a current recovery process, preventing them from suffering degradation. Additionally, the hydration condition of the electrolyte membrane is evaluated, and if it is determined that the hydration level is not sufficient, the current recovery process will be carried out relatively early on, thereby avoiding application of excessive load on the electrolyte membrane while its hydration level is insufficient, and avoiding degradation of the electrolyte membrane. Further, in the event of a determination that the electrolyte membrane is at an appropriate hydration level, the extent of current limitation in the current limiting process will be relatively small, thus avoiding diminished load responsiveness of the fuel cell system 100 which could result from excessive limiting of current.

B. Modified Embodiments:

The present invention is in no way limited by to the embodiment hereinabove, and may be worked in various other modes without departing from the spirit thereof, with possible modifications including the following, for example.

B1. Modified Embodiment 1:

In the preceding embodiment, the controller 40 measures the voltage of each individual unit cell 1 and decides to execute the current recovery process depending on these measurements; however, voltage need not be measured for each individual unit cell 1. The current recovery process may instead take place at prescribed timing on an ongoing basis, for example.

B2. Modified Embodiment 2:

In the preceding embodiment, by switching between first and second current limit value maps MP1, MP2 according to the Dry flag, the threshold value for the minimum cell voltage ($Vm_2$, $Vm_4$) changes so that if the Dry flag is "ON", the current limiting process will be triggered under more lenient conditions. However, the condition for triggering the current limiting process need not be set through minimum cell voltage. For example, the current limiting process may be triggered when the extent of increase in FC required power meets or exceeds a certain threshold value. In this case, the controller 40 will progressively lower the threshold value in association with lower hydration levels inside the fuel cell, so that the current limiting process will be triggered under more lenient conditions.

B3. Modified Embodiment 3:

In the preceding embodiment, the controller 40 executes the current limiting process using two current limit value maps MP1, MP2; however, a greater number of current limit value maps may be used instead. In this case, the Dry flag may assume values besides "ON" and "OFF" for indicating the level of hydration of the electrolyte membrane. Moreover, the current limit value maps are not limited to the two current limit value maps MP1, MP2 of the preceding embodiment, and may be established appropriately based on testing. Also, it is not necessary for the controller 40 to have current limit value maps. In this case, maximum current limit values equivalent in function to the Dry flag may be established in the controller 40. Alternatively, there may be maps that correlate maximum current limit values with hydration condition index values which have been associated with hydration conditions inside the fuel cell, equivalent in function to the Dry flag.

B4. Modified Embodiment 4:

In the preceding embodiment, the controller 40 measures the impedance of the fuel cell stack 10 with the impedance measuring portion 90, and based on the measurement, determines the hydration condition of the electrolyte membrane and sets the Dry flag. However, determination of the hydration condition of the electrolyte membrane may be accomplished by some other method. For example, the humidity level of the cathode off-gases in the air discharge line 36 of the air supply system 30 may be measured, and the Dry flag then set according to this measurement.

B5. Modified Embodiment 5:

In the preceding embodiment, the initial value of the Dry flag is set to "ON", and the Dry flag is maintained "ON" during the interval from startup of the fuel cell system 100 to execution of impedance measurement (FIG. 5: Step S210). Alternatively, the Dry flag may instead be set to an initial value of "OFF". However, for the reason described below, it is preferable for the initial value of the Dry flag to be set to "ON". During startup of the fuel cell system 100, particularly under low-temperature (e.g. below freezing) conditions, there is a high probability that the electrolyte membrane will be dry. Thus, by setting the initial value of the Dry flag to "ON", the probability of triggering the current limiting process (FIG. 4: Step S150) at startup of the fuel cell system 100 will be higher. Thus, application of excessive load to the fuel cell stack 10 will be avoided.

The invention claimed is:

1. A control method of a fuel cell system that delivers output from a fuel cell according to output requirement, wherein the fuel cell system includes a controller, a hydration detector and a voltage measurer and the fuel cell includes a plurality of power generating elements, comprising the steps of:
    (a) repeatedly measuring, by the hydration detector of the controller, the hydration conditions inside the fuel cell and detecting, by the controller, a hydration condition index that indicates a hydration level and is associated with the hydration conditions inside the fuel cell;
    (b) continuously measuring, by the voltage measurer, voltage individually for each of the plurality of power generating elements;
    (c) generating power in the fuel cell according to a required current value which is equivalent to the output requirement, and executing, by the controller, a limited operation that reduces a current value of the fuel cell to a lower value than the required current value in order to temporarily limit output of the fuel cell, during operation of the fuel cell, when the voltage measurement of a part of the generating elements fall below a threshold value; and (d) reducing, by the controller, the threshold value when there is an increase in the hydration level as indicated by the hydration condition index before the step (c) in order to reduce an execution frequency of the limited operation.

2. The control method in accordance with claim 1, wherein the step (a) includes a step of measuring resistance of the fuel cell as the hydration condition index, and the threshold value is set to a smaller value accompanied with a decrease in measured resistance.

3. The control method in accordance with claim 1, further comprising the step of:

setting, by the controller, either a first value indicating a relatively low hydration level or a second value indicating a relatively high hydration level, as a determined value of hydration level indicated by the hydration condition index, and setting, by the controller, the threshold value depending on the determined value, wherein the determined value is set to the first value until the hydration condition index is detected in step (a).

4. The control method in accordance with claim 1, wherein the step(c) includes a step of setting an upper limit of the current value of the fuel cell in the limited operation, wherein the upper limit of the current of the fuel cell is determined with respect to the voltage measurement value of the part of the generating elements based on a correspondence relationship between voltage and current, and wherein the correspondence relationship is selected from a plurality of correspondence relationships between voltage and current, which are provided in advance, based on the hydration level.

5. The control method in accordance with claim 1, wherein the limited operation in the step(c) is triggered when the lowest voltage measurement of the part of the generating elements has fallen below the threshold value.

6. The control method in accordance with claim 1, further comprising the step of:

(e) executing, by the controller, a process of increasing flow rate of a reactant gas, the reactant gas is supplied to the fuel cell, or a process of increasing gas pressure of the reactant gas with the limited operation.

* * * * *